Patented Jan. 20, 1948

2,434,656

UNITED STATES PATENT OFFICE 2,434,656

PROCESS FOR PURIFYING MODIFIED ROSIN

Irvin W. Humphrey, Wilmington, Del., assignor to Hercules Powder Company, Wilmington, Del., a corporation of Delaware No Drawing. Application June 17, 1944, Serial No. 540,901

12 Claims. (Cl. 260—105)

1

This invention relates to a process for refining a modified rosin. More particularly, it relates to a process for refining dehydrogenated rosin.

Dehydrogenated or disproportionated rosin is ordinarily prepared from wood rosin or gum rosin which has been refined by one or more familiar processes prior to dehydrogenation. Dehydrogenated rosin of a very high grade thus may be obtained, since, in addition to the purification effected through the prior refining treatment, the dehydrogenation treatment itself may lead to substantial change in or destruction of minor constituents in the rosin so that their presence is no longer noticeable.

Although dehydrogenated rosin of a very high quality thus may be prepared, it has been found to be unsatisfactory for certain uses. Thus, when an alkali metal soap even of a dehydrogenated, highly purified rosin is employed as emulsifying agent in the emulsion polymerization of vinyl compounds, and particularly in the copolymerization of butadiene and styrene, undesirably low yields of polymer are obtained. Such low yields heretofore have prevented the use of dehydrogenated rosin soaps in the emulsion polymerization of such vinyl compounds, although its availability and low cost otherwise would render it of considerable practical utility in such application.

It has been discovered in accordance with this invention that the properties of dehydrogenated rosin may be improved substantially in respect to this and other applications by a specific and particular process of fractional distillation.

Now, in accordance with this invention, dehydrogenated or disproportionated rosin is subjected to distillation under reduced pressure and thereby separated into a lower boiling fraction comprising at least about 5% by weight of the original dehydrogenated rosin, an intermediate boiling fraction and a distillation residue consisting of at least about 5% by weight of the original dehydrogenated rosin. Although the entire undistilled dehydrogenated rosin is unsatisfactory after saponification for use in emulsion polymerizations, because of the undesirably low yields of polymer that result, the intermediate boiling fraction thus prepared is of surprising value in this respect. Substantially higher yields of polymer are obtained when soaps of the intermediate boiling fraction which have been prepared according to this invention are employed, than when corresponding soaps of undistilled dehydrogenated rosin are used as polymerization agents.

In accordance with this invention, the relative amounts of the various fractions are a matter

2 of considerable importance. The amount of the lowest boiling fraction should correspond to not less than about 5% by weight of the original dehydrogenated rosin and preferably to between about 5% and about 30% by weight of the original dehydrogenated rosin. In certain preferable cases it will represent about 10% by weight of the original dehydrogenated rosin. Likewise, the highest boiling or nonvolatile fraction, which generally is allowed to remain undistilled, should represent at least about 5%, and preferably between about 5% and about 25%, by weight of the original dehydrogenated rosin. It also will be found desirable in certain cases to have this fraction correspond to about 10% by weight of the original undistilled rosin. Accordingly, the fraction of intermediate boiling range generally will represent from about 50% to about 90% by weight of the original dehydrogenated rosin, and, in certain preferable cases, it will contain about 80% by weight of the initial dehydrogenated rosin. This intermediate boiling fraction represents a new and highly improved dehydrogenated rosin which possesses numerous advantages over dehydrogenated rosins heretofore known to the art, particularly as an emulsifying agent in the form of its alkali metal soap for the emulsion polymerization of unsaturated vinyl compounds such as butadiene, styrene, etc.

Now, having set forth the broader aspects of the invention and its purposes, certain specific embodiments thereof will be illustrated by the following examples. In the examples, all proportions and quantities of materials are expressed in parts by weight unless otherwise specified.

Example I

A palladium-on-carbon catalyst was prepared by treating 225 parts of 6–16 mesh Columbia Activated Carbon (cocoanut charcoal) with a dilute acidic aqueous solution of $PdCl_2$ containing an amount of $PdCl_2$ equivalent to 2.8 parts palladium. After the palladium had deposited on the carbon, the catalyst was heated at a temperature between 200° and 260° C. for a period of 6 hours while in a stream of hydrogen gas to remove water and any acid present.

Fifteen hundred parts of N wood rosin then were heated in the presence of 175 parts of the above catalyst to a temperature within the range of 260° to 270° C. for 2½ hours. An atmosphere of nitrogen gas was maintained over the molten rosin during the heating to prevent any reaction between the hot rosin and atmospheric oxygen. At the end of the heating period the rosin was allowed to cool slightly and was then decanted from the catalyst. The dehydrogenated rosin thus prepared had an acid number of 155, and its color graded WG.

Eleven hundred parts of the dehydrogenated rosin were placed in a still having a capacity of 3000 parts. The still was heated by Dowtherm Vapor, maintained at a temperature sufficient to distill the rosin. The rosin was distilled under an absolute pressure of approximately 5 mm. mercury. As the distillation progressed, the temperature of the surrounding heating medium was raised progressively so that the distillation temperature of the rosin was correspondingly increased. The distillation temperature was measured as the temperature of the vapors leaving the still.

The first fraction was collected from the time distillation commenced until the temperature of the vapors reached about 250° C. The fraction represented 19% of the dehydrogenated rosin placed in the still and amounted to 209 parts. The second fraction, which corresponded to 72% of the dehydrogenated rosin originally placed in the still, then was collected from the end point of the first fraction until the vapor temperature reached about 278° C. The residue, which was allowed to remain in the still, contained all higher boiling or nonvolatile components of the original dehydrogenated rosin and corresponded to 8% by weight of the original dehydrogenated rosin.

In order to test the purified dehydrogenated rosin in emulsion polymerization, a portion of the middle fraction or, in other words, of the fraction which was distilled between about 250° C. and about 278° C. was saponified with aqueous alkali, using an amount of alkali equivalent to 200% of the amount theoretically necessary for neutralization, and the concentration of the resulting solution was adjusted to 2.5%. To 20 parts of this 2.5% solution were added 0.30 part potassium persulfate, 0.08 part isoamyl alcohol, 6.8 parts butadiene and 2.25 parts styrene. This mixture was sealed in a glass tube, and its temperature maintained at 50° C. for 16 hours while the tube was rotated slowly to agitate its contents. At the end of the heating period, the polymer was precipitated by the addition of saturated salt solution, washed, dried, and weighed.

The intermediate boiling fraction when tested in this manner led to a yield of 96% of the amount of polymer theoretically obtainable.

It is evident from this value that the distillation of dehydrogenated rosin provides a product which is of marked value in the emulsion polymerization of vinyl compounds, such as butadiene and styrene.

In order to provide further illustrations and embodiments of this invention and to indicate the valuable improvements that may be obtained in accordance with the method thereof, the following three examples also are presented. In these examples, the dehydrogenated rosin has been separated by distillation into fractions of varying proportions in order to illustrate the relative improvements that may be obtained under various conditions. From the results shown by these examples, it is evident that the proportion of the dehydrogenated rosin which is collected in the intermediate boiling fraction has a significant effect upon the properties of this fraction, and that highly advantageous improvements may be obtained by the distillation of dehydrogenated rosin according to the present invention.

*Example II*

A sample of K wood rosin was dehydrogenated according to the method described in Example I. The dehyrogenated resin, after removal from the catalyst, was distilled at a pressure of about 1 mm. mercury and thereby separated into two fractions and a residue. The lower boiling fraction amounted to 13% of the original dehydrogenated rosin. The intermediate boiling fraction amounted to 52% of the rosin and the residue corresponded to 35% of the original dehydrogenated rosin.

Ten parts of the intermediate boiling fraction were mixed with 400 parts of water and neutralized by the addition of sodium hydroxide. To the neutral soap solution thus formed, there were then added 0.6 part of potassium persulfate, 1 part of lauryl mercaptan, 50 parts of styrene, and 150 parts of butadiene. The mixture was sealed in a glass container and gently agitated at a temperature of 50° C. for a period of 14 hours. The resulting emulsion then was run into an open vessel containing 20 parts of a 2% aqueous solution of phenyl-beta-naphthylamine, the excess butadiene was removed by stripping, and the polymer precipitated by the addition of an excess of saturated salt solution. The precipitated polymer was washed thoroughly with water and then with alcohol, and dried and weighed.

When tested in this manner, the use of an intermediate boiling fraction led to the formation of an amount of polymer which corresponded to 73% of that theoretically obtainable. A similar test upon the original, undistilled dehydrogenated rosin led to the formation of only 46% polymer, indicating that by the distillation of the dehydrogenated rosin according to the present invention, a 160% improvement in the yield of polymer had been obtained.

*Example III*

K wood rosin was dehydrogenated according to the method of Example I and separated by fractional distillation under reduced pressure, into 10% of a low boiling component, 80% of an intermediate boiling component, and 10% of a distillation residue. When tested in the emulsion polymerization of butadiene and styrene according to the method of Example II, the use of the intermediate boiling fraction resulted in the formation of 73% polymer. On the other hand, the use of the low boiling fraction and of the residue, when tested in an identical manner, resulted in the formation of much lower amounts of polymer.

From the results indicated in the preceding three examples, it is apparent that the distillation of dehydrogenated rosin according to the present invention leads to a marked improvement in its effectiveness in the emulsion polymerization of vinyl compounds such as butadiene and styrene. That this improvement is due to the distillation and not to other possible factors is demonstrated by Example IV, in which the use of the intermediate boiling fraction led to much higher yields of polymer than did the use of either the low boiling fraction or the residue.

*Example IV*

One hundred twenty parts of a palladium-on-activated carbon catalyst were added to 1200 parts of molten Nelio gum rosin. The rosin and catalyst then were heated under a nitrogen atmosphere for one hour at 260° to 285° C.

One thousand parts of the dehydrogenated gum rosin thus produced, were mixed with 33 parts of maleic anhydride and heated, with agitation, at 170° to 180° C. for four hours under a carbon dioxide atmosphere. The product then was fractionally distilled at an absolute pressure of 3 mm. mercury and thereby separated into the fractions shown in the following table. The temperature of distillation shown in the table is the temperature of the vapor leaving the molten rosin.

The several fractions then were tested in the emulsion polymerization of butadiene and styrene according to the method employed in Example I, by substituting for the dehydrogenated rosin of that example the particular fraction under test. The yield of the polymer which was then obtained with each fraction is shown in the following table:

| Fraction | Distillation Temperature | Per Cent of Total Dehydrogenated Rosin | Yield of Polymer |
| --- | --- | --- | --- |
| | | | Per Cent |
| 1 | Up to 213° C | 19.6 | 46 |
| 2 | 213°–226° C | 20.8 | 92 |
| 3 | 226° C | 24.4 | 83 |
| 4 | 226°–234° C | 15.9 | 83 |
| 5 | Residue | 19.1 | 10 |

From the yields of polymer shown in this table, it is apparent that the three intermediate boiling fractions, which alternatively could have been collected as one fraction, represent a marked improvement over the low boiling fraction and the residue.

It is to be appreciated that when reference is made in the preceding examples to the amount of polymer theoretically obtainable, this quantity is calculated from the amounts of butadiene and styrene employed and with the assumption of complete reaction. The maximum amount practically obtainable in various testing methods known to the art, even under the most favorable conditions, may fall considerably below this theoretical value and may vary considerably from one test method to another. Although such differences may render difficult the expression of test values on an absolute basis, the differences do not detract from the value of any one method of test for determining the relative effectiveness of various emulsifying agents in the polymerization of vinyl compounds such as butadiene and styrene.

From the preceding examples, it is apparent that a substantial improvement in the properties of dehydrogenated rosin may be obtained by distillation under reduced pressure and with separation of the dehydrogenated rosin into at least about 5% of a low boiling fraction, an intermediate boiling fraction, and at least about 5% of a distillation residue. As shown by Examples II, III, and IV, the intermediate fraction is of greatly improved value as an emulsifying agent in the polymerization of butadiene and styrene, by comparison either with the undistilled dehydrogenated rosin or with the low boiling fraction and the residue.

The pressure employed for the distillation should be low enough to permit distillation at a temperature which will not cause undue decomposition of the rosin during distillation. Accordingly, pressures below about 30 mm. mercury are desirable, and it is preferable to employ a pressure of about 10 mm. or lower.

The temperature range throughout which the intermediate boiling fraction distills depends upon the pressure employed during the distillation, the relative size of the intermediate boiling fraction, and similar factors. In general, it has been found that when the pressure during the distillation is maintained within the range of about 5–10 mm. mercury, the distillation may be carried out satisfactorily within the temperature range of about 210° C. to about 275° C. when the measured temperature is that of the vapors leaving the boiling rosin. These temperature limits are not critical, however, and they may vary somewhat according to the purity of the dehydrogenated rosin, the proportion of the rosin collected in the various fractions, the pressure, and similar factors. For example, an increase in the proportion of the dehydrogenated rosin which is collected in the intermediate boiling fraction tends to broaden the distillation range. The distillation temperatures also increase or decrease with the pressure, according to relationships well known to the art. Thus, when the pressure is increased, the temperature of distillation is increased, and conversely when the pressure is lowered, the temperature at which the dehydrogenated rosin distills also will be lowered to a certain extent.

In order to obtain a product of the highest quality, it is desirable to minimize contact of the rosin with the atmosphere by means of a suitable inert gas such as nitrogen, carbon dioxide, or the like.

The dehydrogenated rosin which is employed in accordance with this invention is obtained by contacting a gum or wood rosin at a suitable temperature with an active hydrogenation catalyst in the absence of added hydrogen and at an elevated temperature, until the rosin contains at least about 40% dehydroabietic acid and until less than about 5%, and preferably less than about 1%, of abietic acid remains. Suitable hydrogenation catalysts for effecting this conversion are palladium, platinum, nickel, copper chromite, and the like. The catalyst may be supported on a carrier, such as granular alumina, fibrous asbestos, or activated charcoal. The dehydrogenation or disproportionation with a palladium catalyst, for example, may be conducted either by a batchwise or continuous procedure. Thus, in a batchwise procedure, the rosin may be contacted with from about 5% to about 20% by weight, based on the weight of the rosin, of a catalyst consisting of from 1 to 2 parts palladium deposited on 100 parts activated charcoal. The rosin and the catalyst are heated together at about 150° C. to about 300° C. for about 1 to 5 hours. In the continuous process, the molten rosin is flowed over the supported palladium catalyst at a temperature within the range of about 225° to about 300° C. for a period of time from about 15 minutes to about 1 hour.

A variety of dehydrogenated rosins may be treated according to the present invention. Thus, either dehydrogenated wood rosin or dehydrogenated gum rosin may be refined according to the herein disclosed process. The wood rosin preferably is refined prior to the dehydrogenation and subsequent distillation although it will be apparent that a substantial improvement in certain properties also may be obtained by practicing the invention with dehydrogenated unrefined wood rosin. The rosin prior to dehydrogenation may be refined according to one or more of the several methods that are well known to those skilled in the art, for example, by treatment with selective solvents, with adsorbents, by crystallization, and the like. Prior to dehydrogenation the rosin also may have been treated with acidic isomerizing agents to effect its isomerization.

As illustrated by Example IV, prior to distillation the rosin may have been treated with maleic anhydride as an aid in removing polymerization inhibitors or retarders. This treatment may be accomplished by heating the dehydrogenated or disproportionated rosin with maleic anhydride, usually in an amount of from about 1% to about 5% of maleic anhydride based on the weight of the rosin, to a temperature of about 100° to about 200° C. for a period of, for example, about 1 to about 3 hours.

If desired, the intermediate boiling fraction may be collected during the distillation as one or more fractions. The intermediate boiling fraction may also be redistilled, if desirable, to obtain an even more highly purified product. In general, however, this latter additional treatment will not be found to be necessary, although collection of the intermediate boiling fractions in the form of two or more fractions may be found to be desirable in certain circumstances.

Although specific embodiments of the invention have been illustrated by the use of batch distillation, it will be appreciated that other well known distillation techniques may be employed. For example, a continuous still of the flash evaporation type may be employed, with control of the temperature of volatilization and condensation in order to obtain separation of the desired fractions. Other suitable distillation techniques will be apparent to those skilled in the art.

The product of this invention is of particular value in the preparation of emulsifying agents of the type hereinbefore illustrated. However, it is not limited to this use since the improvements obtained render the product particularly suited for applications where the purity or homogeneity of the dehydrogenated rosin is of moment. It is known that the benzenoid properties of dehydrogenated rosin render it useful in preparing derivatives wherein substituents are introduced into the aromatic portion of the rosin acid nucleus. As a result of the purification which may be obtained through treatment of the dehydrogenated rosin, derivatives of substantially greater purity may be prepared without an undue increase in their cost. This purified dehydrogenated rosin is therefore of value in the synthesis of amino derivatives, dye intermediates, detergents, and the like. The products prepared according to the present process are also of value in the preparation of esters and alkyd-type resins and the like.

A marked improvement for use in emulsion polymerization can be obtained even when the rosin has been highly purified prior to dehydrogenation. This is particularly noticeable when the fractionally distilled dehydrogenated rosin is to be employed in the preparation of emulsifying agents for the mass emulsion polymerization of butadiene and styrene and similar materials. This is indeed surprising since it would be expected that the previously obtained high degree of purification would render subsequent refining treatments of little or no avail.

Where in the specification and appended claims the term "dehydrogenated rosin" is employed, it is meant to include disproportionated rosin.

What I claim and desire to protect by Letters Patent is:

1. The process of refining dehydrogenated rosin which comprises subjecting a dehydrogenated rosin containing at least about 40% dehydroabietic acid and no more than about 5% of abietic acid to distillation under reduced pressure and separating said dehydrogenated rosin into a lower boiling fraction consisting of at least about 5% by weight of the dehydrogenated rosin, an intermediate boiling fraction, and a distillation residue consisting of at least about 5% by weight of the dehydrogenated rosin.

2. The process of refining dehydrogenated rosin which comprises subjecting a dehydrogenated rosin containing at least about 40% dehydroabietic acid and no more than about 5% of abietic acid to distillation under reduced pressure and separating said dehydrogenated rosin into a lower boiling fraction consisting of about 5% to about 30% by weight of the dehydrogenated rosin, an intermediate boiling fraction consisting of from about 50% to about 90% by weight of the dehydrogenated rosin, and a distillation residue consisting of from about 5% to about 25% by weight of the dehydrogenated rosin.

3. The process of refining dehydrogenated rosin which comprises subjecting a dehydrogenated rosin containing at least about 40% dehydroabietic acid and no more than about 5% of abietic acid to distillation under reduced pressure and separating said dehydrogenated rosin into a lower boiling fraction consisting of about 10% by weight of the dehydrogenated rosin, an intermediate boiling fraction consisting of about 80% by weight of the dehydrogenated rosin, and a distillation residue consisting of about 10% by weight of the dehydrogenated rosin.

4. The process of refining dehydrogenated rosin which comprises subjecting a dehydrogenated rosin containing at least about 40% dehydroabietic acid and no more than about 5% of abietic acid to distillation under an absolute pressure of less than about 30 mm. mercury and separating said dehydrogenated rosin into a lower boiling fraction consisting of at least about 5% by weight of the dehydrogenated rosin, an intermediate boiling fraction, and a distillation residue consisting of at least about 5% by weight of the dehydrogenated rosin.

5. The process of refining dehydrogenated rosin which comprises subjecting a dehydrogenated rosin containing at least about 40% dehydroabietic acid and no more than about 5% of abietic acid to distillation under an absolute pressure of less than about 30 mm. mercury and separating said dehydrogenated rosin into a lower boiling fraction consisting of about 5% to about 30% by weight of the dehydrogenated rosin, an intermediate boiling fraction consisting of from about 50 to about 90% by weight of the dehydrogenated rosin, and a distillation residue consisting of from about 5% to about 25% by weight of the dehydrogenated rosin.

6. The process of refining dehydrogenated rosin which comprises subjecting a dehydrogenated rosin containing at least about 40% dehydroabietic acid and no more than about 5% of abietic acid to distillation under an absolute pressure of less than about 30 mm. mercury and separating said dehydrogenated rosin into a lower boiling fraction consisting of about 10% by weight of the dehydrogenated rosin, an intermediate boiling fraction consisting of about 80% by weight of the dehydrogenated rosin, and a distillation residue consisting of about 10% by weight of the dehydrogenated rosin.

7. The process of preparing a product capable upon saponification of forming an improved emulsifying agent for emulsion polymerization of vinyl compounds which comprises contacting a rosin with an active hydrogenation catalyst in the absence of added hydrogen to form a dehydrogenated rosin containing at least about 40% dehydroabietic acid and no more than about 5% of abietic acid, subjecting the dehydrogenated product to distillation under reduced pressure and separating a lower boiling fraction consisting of at least about 5% by weight of the product, an intermediate boiling fraction, and a distillation residue consisting of at least about 5% by weight of said product.

8. The process of preparing a product capable upon saponification of forming an improved emulsifying agent for emulsion polymerization of vinyl compounds which comprises contacting a rosin with an active hydrogenation catalyst in the absence of added hydrogen to form a dehydrogenated rosin containing at least about 40% dehydroabietic acid and no more than about 5% of abietic acid, subjecting the dehydrogenated product to distillation under reduced pressure and separating a lower boiling fraction consisting of from about 5% to about 30% by weight of said product, an intermediate boiling fraction consisting of from about 50% to about 90% by weight of said product, and a distillation residue consisting of from about 5% to about 25% by weight of said product.

9. The process of preparing a product capable upon saponification of forming an improved emulsifying agent for emulsion polymerization of vinyl compounds, which comprises contacting a rosin with an active hydrogenation catalyst in the absence of added hydrogen to form a dehydrogenated rosin containing at least about 40% dehydroabietic acid and no more than about 5% of abietic acid, subjecting the dehydrogenated product to distillation under reduced pressure and separating a lower boiling fraction consisting of about 10% by weight of said product, an intermediate boiling fraction consisting of about 80% by weight of said product, and a distillation residue consisting of about 10% by weight of said product.

10. The process of refining dehydrogenated rosin which comprises subjecting a dehydrogenated rosin containing at least about 40% dehydroabietic acid and no more than about 5% of abietic acid to continuous distillation under reduced pressure and separating said dehydrogenated rosin into a lower boiling fraction consisting of from about 5% to about 30% by weight of the dehydrogenated rosin, an intermediate boiling fraction consisting of from about 50% to about 90% by weight of the dehydrogenated rosin, and a distillation residue consisting of from about 5% to about 25% by weight of the dehydrogenated rosin.

11. The process which comprises subjecting a dehydrogenated rosin containing at least about 40% dehydroabietic acid and no more than about 5% of abietic acid to continuous distillation under reduced pressure and thereby separating said dehydrogenated rosin into from about 5% to about 30% by weight of a lower boiling fraction, from about 50% to about 90% by weight of an intermediate boiling fraction, and from about 5% to about 25% by weight of a distillation residue, and reacting said intermediate boiling fraction with an alkali.

12. The process which comprises subjecting a dehydrogenated rosin containing at least about 40% dehydroabietic acid and no more than about 5% of abietic acid to fractional distillation under reduced pressure and thereby separating said dehydrogenated rosin into about 10% by weight of a lower boiling fraction, about 80% by weight of an intermediate boiling fraction, and about 10% by weight of a distillation residue, and reacting said intermediate fraction with an alkali.

IRVIN W. HUMPHREY.

REFERENCES CITED

The following references are of record in the file of this patent:

UNITED STATES PATENTS

| Number | Name | Date |
| --- | --- | --- |
| 2,072,628 | Brennan et al. | Mar. 2, 1937 |
| 2,201,237 | Littman | May 21, 1940 |
| 2,247,399 | Palmer et al. | July 1, 1941 |
| 2,277,351 | Pohle et al. | Mar. 24, 1942 |

OTHER REFERENCES

Littman, Jour. Amer. Chem. Soc., vol. 60 (1938), pp. 1419-1421.

Certificate of Correction

Patent No. 2,434,656.                                             January 20, 1948.

IRVIN W. HUMPHREY

It is hereby certified that errors appear in the printed specification of the above numbered patent requiring correction as follows: Column 3, line 42, for "25%" read *2.5%*; column 8, line 55, for the numeral "50" read *50%*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*